United States Patent
Shim et al.

(10) Patent No.: US 11,093,212 B2
(45) Date of Patent: Aug. 17, 2021

(54) ELECTRONIC APPARATUS, CONTROL METHOD OF THE SAME, AND RECORDING MEDIA

(71) Applicant: SAMSUNG ELECTRONICS CO., LTD., Suwon-si (KR)

(72) Inventors: Woo-chul Shim, Yongin-si (KR); Il-joo Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 15/875,596

(22) Filed: Jan. 19, 2018

(65) Prior Publication Data

US 2018/0210702 A1 Jul. 26, 2018

(30) Foreign Application Priority Data

Jan. 20, 2017 (KR) ........................ 10-2017-0009898

(51) Int. Cl.
| | |
|---|---|
| *G06F 3/16* | (2006.01) |
| *G10L 15/18* | (2013.01) |
| *G10L 15/22* | (2006.01) |
| *G08C 17/02* | (2006.01) |

(52) U.S. Cl.
CPC ............. *G06F 3/167* (2013.01); *G08C 17/02* (2013.01); *G10L 15/1822* (2013.01); *G10L 15/22* (2013.01); *G08C 2201/31* (2013.01); *G10L 2015/223* (2013.01)

(58) Field of Classification Search
CPC ... G10L 15/22; G10L 2015/223; G10L 17/00; G10L 15/1822; G05B 15/02; G05B 2219/2642; G05B 19/10; G06F 3/167; G06F 21/32; H04L 12/2803; H04L 12/2816; H04L 63/105; H04L 12/2829; H04L 9/3231; G06N 20/00; G08C 17/02; G08C 2201/31
See application file for complete search history.

(56) References Cited

U.S. PATENT DOCUMENTS

| | | | |
|---|---|---|---|
| 2001/0047265 A1 | 11/2001 | Sepe, Jr. | |
| 2012/0035935 A1 | 2/2012 | Park et al. | |
| 2013/0227678 A1* | 8/2013 | Kang | G06F 21/32 |
| | | | 726/19 |

(Continued)

OTHER PUBLICATIONS

International Search Report (PCT/ISA/210) and Written Opinion (PCT/ISA/237) dated Apr. 30, 2018 issued by the International Searching Authority in International Application No. PCT/KR2018/000526.

(Continued)

*Primary Examiner* — Angela A Armstrong
(74) *Attorney, Agent, or Firm* — Sughrue Mion, PLLC

(57) ABSTRACT

An electronic apparatus and a control method of the electronic apparatus are provided. The electronic apparatus includes: a receiver configured to receive a voice command of a user; and a processor configured to determine a switching probability from a first state corresponding to a current point of time over to a second state corresponding to the voice command, based on the switching probability previously set between a plurality of states related to the electronic apparatus, and selectively perform an operation corresponding to the voice command in accordance with the determined switching probability.

13 Claims, 10 Drawing Sheets

(56) References Cited

U.S. PATENT DOCUMENTS

| | | | |
|---|---|---|---|
| 2015/0228275 A1* | 8/2015 | Watanabe | G10L 15/142 |
| | | | 704/275 |
| 2016/0021105 A1* | 1/2016 | Pellom | G06F 16/3331 |
| | | | 726/7 |
| 2016/0125879 A1 | 5/2016 | Lovitt | |
| 2016/0155443 A1* | 6/2016 | Khan | G06F 1/3203 |
| | | | 704/275 |
| 2016/0372121 A1 | 12/2016 | Li et al. | |
| 2018/0288161 A1* | 10/2018 | Saxena | H04L 67/22 |

OTHER PUBLICATIONS

Communication dated Oct. 11, 2019, issued by the European Patent Office in counterpart European Application No. 18741651.6.

* cited by examiner

FIG. 8

| FROM | TO | DEFAULT VALUE | ADJUSTED VALUE |
|---|---|---|---|
| WatchingTV | OpenDoor | 0.6 | 0.45 |
| WatchingTV | Sleep | 0.4 | 0.7 |
| Sleep | ListeningRadio | 0.7 | 0.75 |
| WatchingTV | ListeningRadio | 0.8 | 0.6 |
| ⋮ | ⋮ | ⋮ | ⋮ |

ELECTRONIC APPARATUS, CONTROL METHOD OF THE SAME, AND RECORDING MEDIA

CROSS-REFERENCE TO RELATED THE APPLICATION

This application claims priority from Korean Patent Application No. 10-2017-0009898 filed on Jan. 20, 2017 in the Korean Intellectual Property Office, the disclosure of which is incorporated by reference herein in its entirety.

BACKGROUND

1. Field

The apparatuses and methods consistent with example embodiments relate to an electronic apparatus capable of operating in response to a command issued by a user's speech, a control method of the same, and a recording medium, and more particularly to an electronic apparatus, which determines whether a received command has been intended by a user and selectively performs an operation directed by the command in accordance with determination results, a control method of the same, and a recording medium.

2. Description of the Related Art

To compute and process information in accordance with certain processes, an electronic apparatus typically includes a central processing unit (CPU), a chipset, a memory, and like electronic components for computation. Such an electronic apparatus may be classified variously in accordance with what information will be processed therein. For example, the electronic apparatus is classified into an information processing apparatus such as a personal computer, a server, or the like for processing general information, and an image processing apparatus for processing image information. The image processing apparatus, the display apparatus, the information processing apparatus, or like electronic apparatus performs functions that a single entity is specifically designed to perform. Further, a plurality of electronic apparatuses are connected to one another to form a system of a single unit network, so that the electronic apparatuses can collaborate with one another under this system, thereby performing various extended functions that a single entity (e.g., special-purpose device) cannot perform. As an example of this concept, there are Internet of Things (IoT) devices.

Among many user interface (UI) environments for operating the electronic apparatus, a voice recognition method has recently been in the limelight. In particular, the voice recognition method has been adopted more actively in the operation of systems that include multiple electronic apparatus components. Although there is little difference in details according to how the system or apparatus is materialized, the voice recognition method generally undergoes processes of converting a voice signal input through a microphone into a text, determining a command corresponding to the converted text, and executing an operation directed by the determined command in the electronic apparatus. However, it is possible for an operation unintended by a user to be performed in such an environment of carrying out a voice command.

For example, a voice recognition apparatus for voice recognition may receive a signal from a malicious user, such as a hacker, instead of a signal caused by a user speech. Since the voice recognition apparatus cannot distinguish between a signal from a user and a signal from the hacker, the signal from the hacker may be subjected to the voice recognition and thus a corresponding operation may be implemented. Therefore, in conventional cases, a hacker may transmit a signal with a malicious command or the like to and thus hack into the electronic apparatus or the system, thereby operating the electronic apparatus or the system overriding the user's original intent.

Accordingly, in terms of security and safety, it is important for the electronic apparatus or the system, which applies the voice recognition to a voice command caused by a user speech, to determine whether the voice command matches the user's intent.

SUMMARY

According to an aspect of an exemplary embodiment, there is provided an electronic apparatus including: a receiver configured to receive a voice command of a user; and a processor configured to determine a switching probability from a first state corresponding to a current point of time over to a second state corresponding to the voice command, based on the switching probability previously set between a plurality of states related to the electronic apparatus, and selectively perform an operation corresponding to the voice command in accordance with the determined switching probability. Thus, the electronic apparatus can prevent a command caused by a hacker from being executed instead of a voice command normally issued by a user, thereby improving security.

The processor may process an operation corresponding to the voice command to be performed when it is determined that the determined switching probability is greater than a preset threshold value, and may perform preset authentication procedure with regard to the voice command when it is determined that the determined switching probability is less than or equal to the threshold value. Thus, the electronic apparatus can easily determine the switching probability.

The processor may process the operation corresponding to the voice command when it is determined that the authentication procedure is successfully passed, and may generate a warning message to be displayed when the authentication procedure is not successfully passed. Thus, the electronic apparatus can prevent not a hacker attack but the execution of the voice command from being unconditionally blocked.

The processor may generate a user interface (UI) for a user to authenticate the voice command, display the UI on at least one of a display of the electronic apparatus and a display apparatus communicating with the electronic apparatus, and determine whether to pass the authentication procedure based on inputs to the UI.

The processor may generate a user interface (UI) for guiding the user to pronounce a word, display the UI on at least one of a display of the electronic apparatus and a display apparatus communicating with the electronic apparatus, and determine whether to pass the authentication procedure based on a voice input by pronouncing the word displayed on the UI.

The processor may randomly generate the word. Thus, the electronic apparatus can enhance security by preventing words for authentication from leaking out by the hacker.

The electronic apparatus may further include a storage configured to store the switching probability. The processor may adjust a value of the switching probability stored in the storage in accordance with results from selectively performing the operation corresponding to the voice command. Thus, the electronic apparatus can provide a voice command execution environment optimized according to users.

The processor may add a preset first value to the value of the switching probability stored in the storage when the operation corresponding to the voice command is performed, and may subtract a preset second value from the value of the switching probability stored in the storage when the operation corresponding to the voice command is not performed.

The processor may determine the first state based on at least one of sensed information collected through the electronic apparatus, a history of user inputs to the electronic apparatus, and a history of operations performed by the electronic apparatus.

According to an aspect of another exemplary embodiment, there is provided a method of controlling an electronic apparatus, the method including: receiving a voice command of a user; determining a switching probability from a first state corresponding to a current point of time over to a second state corresponding to the voice command, based on the switching probability previously set between a plurality of states related to the electronic apparatus; and selectively performing an operation corresponding to the voice command in accordance with the determined switching probability.

The performing of the operation may include: processing the operation corresponding to the voice command when it is determined that the determined switching probability is greater than a preset threshold value; and performing an authentication procedure with regard to the voice command when it is determined that the determined switching probability is less than or equal to the threshold value.

The performing of the authentication procedure may include: processing the operation corresponding to the voice command when it is determined that the authentication procedure is successfully passed; and generating a warning message to be displayed when the authentication procedure is not successfully passed.

The performing of the authentication procedure may include: generating a user interface (UI) for the user to authenticate the voice command, displaying the UI on at least one of a display of the electronic apparatus and a display apparatus communicating with the electronic apparatus; and determining whether to pass the authentication procedure based on inputs to the UI.

The performing of the authentication procedure may include: generating a user interface (UI) for guiding the user to pronounce a word, displaying the UI on at least one of a display of the electronic apparatus and a display apparatus communicating with the electronic apparatus; and determining whether to pass the authentication procedure based on a voice input by pronouncing the word displayed on the UI.

The electronic apparatus may randomly generate the word.

The method may further include adjusting a value of previously stored switching probability in accordance with results from selectively performing the operation corresponding to the voice command.

The adjusting of the value of the previously stored switching probability may include: adding a preset first value to the value of the previously stored switching probability when the operation corresponding to the voice command is performed; and subtracting a preset second value from the value of the previously stored switching probability when the operation corresponding to the voice command is not being performed.

The determining of the switching probability may include determining the first state based on at least one of sensed information collected through the electronic apparatus, a history of user inputs to the electronic apparatus, and a history of operations performed by the electronic apparatus.

According to an aspect of another exemplary embodiment, there is provided a non-volatile recording medium storing a program that is executable by a processor of an electronic apparatus to perform a method of controlling the electronic apparatus, the method including: receiving a voice command of a user; determining a switching probability from a first state corresponding to a current point of time over to a second state corresponding to the voice command, based on the switching probability previously set between a plurality of states related to the electronic apparatus; and selectively performing an operation corresponding to the voice command in accordance with the determined switching probability.

BRIEF DESCRIPTION OF THE DRAWINGS

The above and/or other aspects will become apparent and more readily appreciated from the following description of exemplary embodiments, taken in conjunction with the accompanying drawings, in which:

FIG. 8 is a table showing a principle of adjusting each value of switching probability in a state model referred to by the voice recognition apparatus according to an exemplary embodiment;

DETAILED DESCRIPTION OF EXEMPLARY EMBODIMENTS

Below, exemplary embodiments will be described in detail with reference to accompanying drawings. The following descriptions of the exemplary embodiments are made by referring to elements shown in the accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art. The word "exemplary" is used herein to mean "serving as an example or illustration." Any aspect or design described herein as "exemplary" is not necessarily to be construed as preferred or advantageous over other aspects or designs.

Further, the exemplary embodiments will describe only elements directly related to the idea of the invention, and description of the other elements will be omitted. However, it will be appreciated that the elements, the descriptions of which are omitted, are not unnecessary to realize the apparatus or system according to the exemplary embodiments. In the following descriptions, terms such as "include" or "have" refer to presence of features, numbers, steps, operations, elements or combination thereof, and do not exclude presence or addition of one or more other features, numbers, steps, operations, elements or combination thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
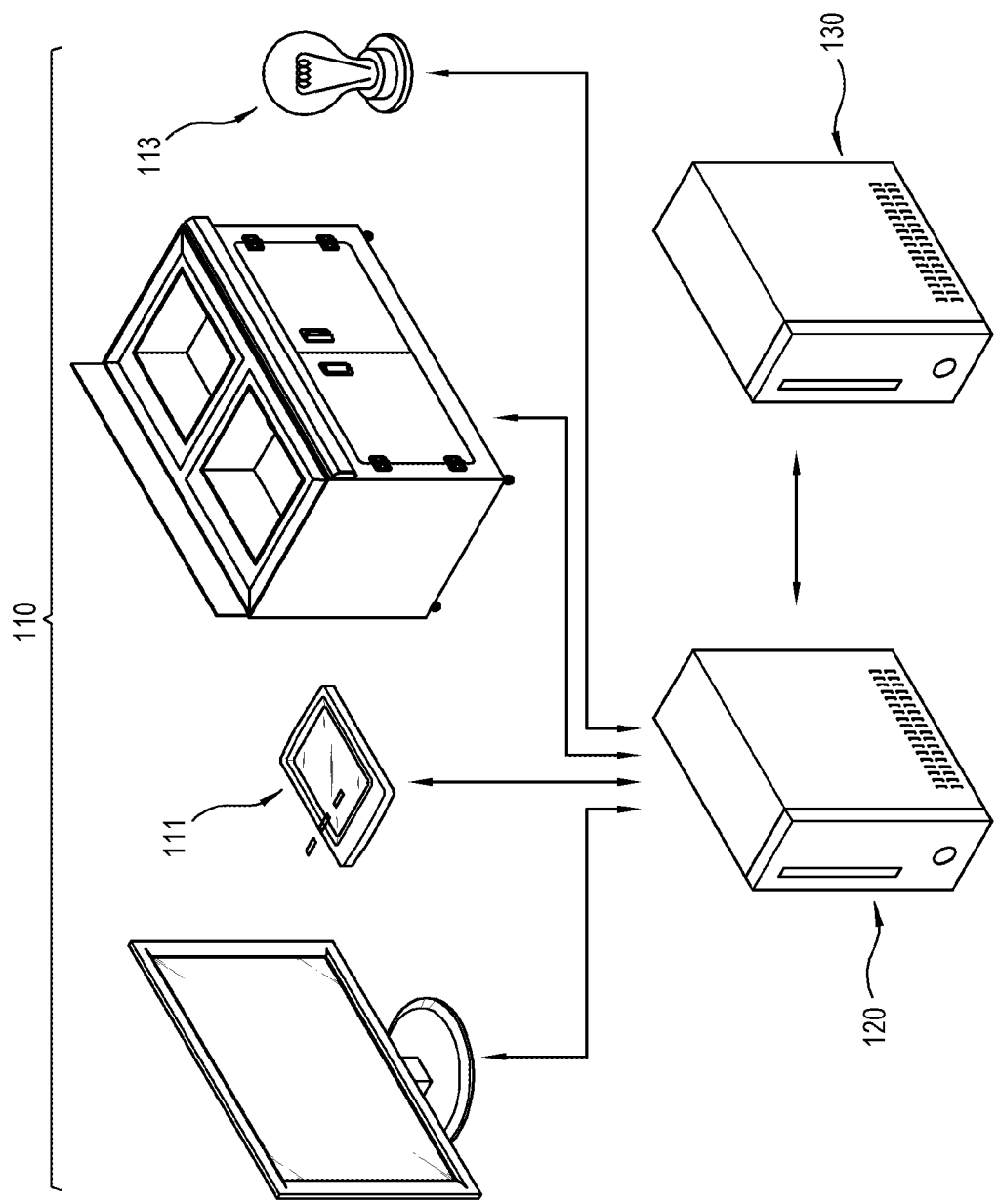
FIG. 1 shows an example of a system according to an exemplary embodiment.

FIG. 1 shows an example of a system according to an exemplary embodiment.

As shown in FIG. 1, the system according to an exemplary embodiment includes a plurality of electronic apparatuses 110. The plurality of electronic apparatuses 110 is not limited to one kind of apparatus, and include a unit entity or thing of various kinds, types and functions. For example, the electronic apparatus 110 may be implemented as a television (TV), an electronic photo frame, a portable multimedia assistant, or like display apparatus for displaying an image; a set-top box, or like image processing apparatus for processing an image signal without directly displaying an image; a washing machine, a refrigerator, an air conditioner, or like home appliances; a printer, a copying machine, a scanner, or like office machine; a sensing system including a sensor; a light bulb; an electric heater; and other apparatuses. Besides such an apparatus stationarily installed on a certain surface, the electronic apparatus 110 may be implemented as a wearable device, a mobile device, or the like.

Within the system, each electronic apparatus 110 may perform wired or wireless communication with other electronic apparatuses 110. In the system, two electronic apparatuses 110 may be connected to each other by a peer-to-peer method, i.e. may be directly connected one-to-one. However, there are more limits to the one-to-one connection as the number of electronic apparatuses 110 increases. In this regard, the system may include a communication relay apparatus 120 connecting with the plurality of electronic apparatuses 110.

The communication relay apparatus 120 may be implemented in various forms according to communication protocols for connection between the plurality of electronic apparatuses 110. For example, the communication relay apparatus 120 may be an access point (AP) or a hub in case of a local area network (LAN) system, and may be a router or a gateway in case of a wide area network (WAN) system.

With this system, when a user inputs a speech to a certain electronic apparatus 110, the system applies a voice process (e.g., speech recognition) to a voice signal corresponding to the speech, and makes an operation be implemented corresponding to a result of the voice process. Herein, the operation may be implemented in the electronic apparatus 100 to which a user inputs the speech, but may be alternatively implemented by another electronic apparatus 110 included in the system.

That is, the system may operate as follows. A user speech of "turn on the light" may be input to a microphone provided in a mobile apparatus 111. The mobile apparatus 111 transmits a voice signal corresponding to the user speech to a voice recognition apparatus 130. The voice recognition apparatus 130 analyzes the voice signal to generate a control signal that corresponds to "turn on the light," and transmits the control signal to a lamp 113 at which the control signal is aimed. The lamp 113 is turned on in response to the instruction of the control signal received from the voice recognition apparatus 130.

In this exemplary embodiment, descriptions will be made on the assumption that the voice recognition apparatus 130 performs the voice process with regard to a user's speech from the electronic apparatus 110 to which the speech is input. Alternatively, the voice process may be performed in the electronic apparatus 110, to which a user's speech is input, in accordance with designs of the system or apparatus. Therefore, this exemplary embodiment is not construed as limiting the present disclosure. Herein, the term "voice recognition apparatus" is used for an apparatus for performing the voice process, and thus does not limit the implementation of the apparatus. The voice recognition apparatus 130 may be one among various electronic apparatuses, including a server.

In this exemplary embodiment, communication between the voice recognition apparatus 130 and the electronic apparatus 110 is performed via the communication relay apparatus 120. Alternatively, the voice recognition apparatus 130 and the electronic apparatus 110 may directly connect and communicate with each other. Further, a voice recognition process may be performed in one voice recognition apparatus 130 or may be shared among a plurality of voice recognition apparatuses 130.

Below, the voice recognition process of the voice recognition apparatus 130 will be described.

Figure 2:
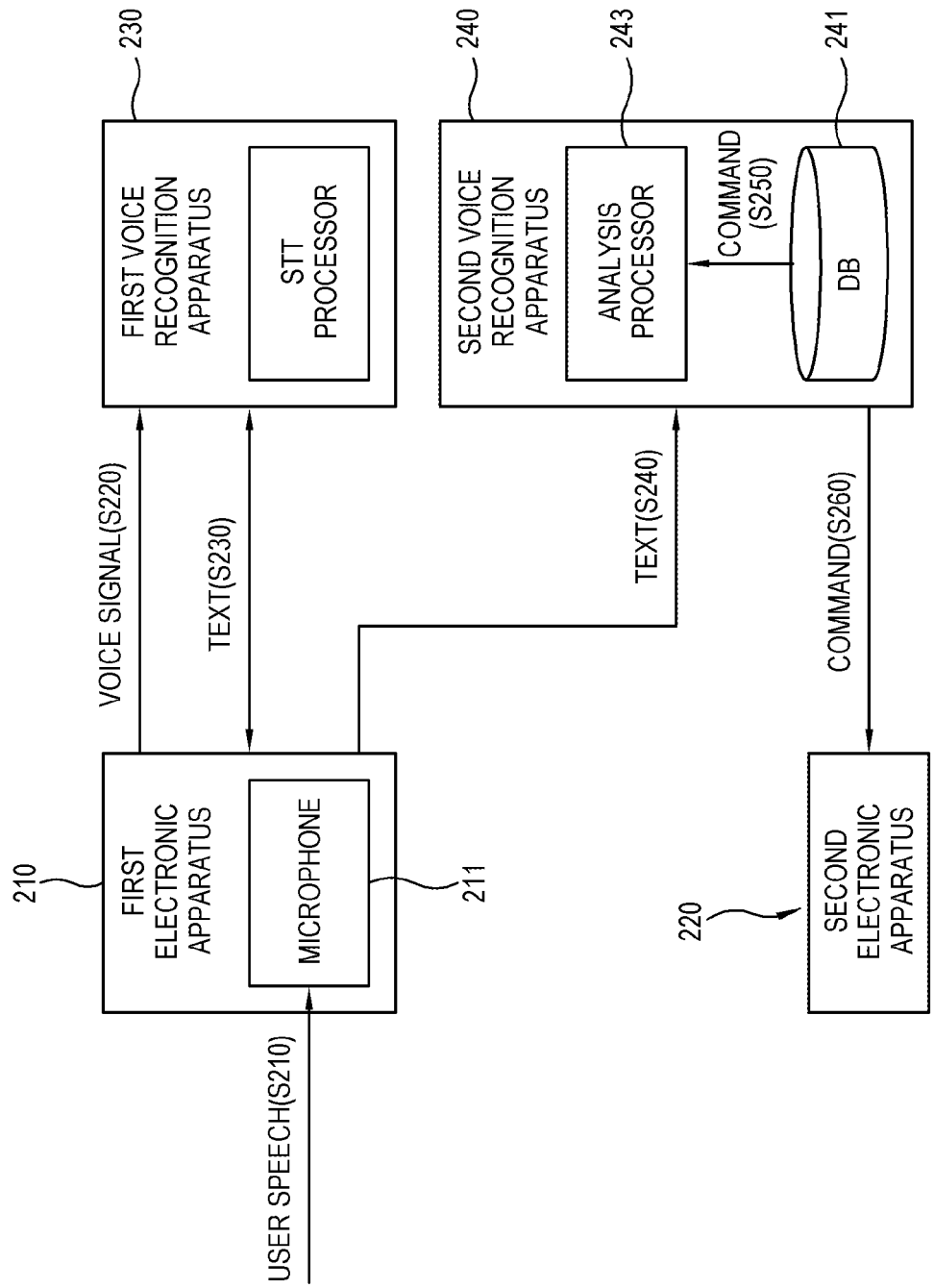
FIG. 2 is a block diagram of showing a process of processing a user speech in a voice recognition apparatus according to an exemplary embodiment.

FIG. 2 is a block diagram showing a process of processing a user speech in a voice recognition apparatus according to an exemplary embodiment.

As shown in FIG. 2, the system includes a first electronic apparatus 210, a second electronic apparatus 220, a first voice recognition apparatus 230, and a second voice recognition apparatus 240. In this exemplary embodiment, the voice recognition process is shared between the first voice recognition apparatus 230 and the second voice recognition apparatus 240. However, this is merely an example, selected by taking an efficiency of the voice recognition process into account, and does not limit the present disclosure. In accordance with designs, the first voice recognition apparatus 230 and the second voice recognition apparatus 240 may be integrated into one apparatus, or the first electronic apparatus 210 may perform the voice recognition process instead of at least one of the first voice recognition apparatus 230 and the second voice recognition apparatus 240.

When receiving a user speech through a microphone 211 at operation S210, the first electronic apparatus 210 transmits an analog voice signal corresponding to the user speech to the first voice recognition apparatus 230 at operation S220.

The first voice recognition apparatus 230 includes a speech-to-text (STT) processor 231 configured to perform an STT process. When the first voice recognition apparatus 230 receives the voice signal from the first electronic apparatus 210, at operation S230 the STT processor 231 performs the STT process to extract a text by converting the voice signal into a digital signal, and transmits the extracted text to the first electronic apparatus 210.

At operation S240, the first electronic apparatus 210 transmits the text received from the first voice recognition apparatus 230 to the second voice recognition apparatus 240.

The second voice recognition apparatus 240 includes a database (DB) 241 configured to store commands corresponding to preset operations, and an analysis processor 243 configured to analyze a context of a text and retrieve the command corresponding to the text from the database 241. The context refers to a meaningful and logical relationship between words in a sentence, phrases, and clauses. That is, the analysis processor 243 analyzes content of a text and determines what command the text corresponds to.

At operation S250, the second voice recognition apparatus 240 uses the analysis processor 243 to analyze the text received from the first electronic apparatus 210, and retrieves the command corresponding to the text from the database 241 in accordance with analysis results.

At operation S260, the second voice recognition apparatus 240 transmits the retrieved command to the apparatus in which the command is executed. For example, when the command instructs the second electronic apparatus 220 to operate, the second voice recognition apparatus 240 transmits the command to the second electronic apparatus 220, so that the second electronic apparatus 220 can perform an operation corresponding to the command. On the other hand, when the command instructs the first electronic apparatus 210 to operate, the second voice recognition apparatus 240 transmits the command to the first electronic apparatus 210.

With these operations, the system selects a command corresponding to a user speech through voice recognition, and makes an operation directed by the selected command be performed.

The STT processor 231 and the analysis processor 243 may be a processor, a central processing unit (CPU), a microprocessor, a processing circuit, a processing board or like hardware element, or may be an application to be executed by the hardware element.

By the way, a hacker may hack into such a structure for the voice recognition process during a certain time window between the operation where a user makes an input to the microphone 211 and the operation where the analysis processor 243 analyzes the text. For example, instead of the speech normally input to the microphone 211, the voice signal may be transmitted from the hacker to the first voice recognition apparatus 230 or the text may be transmitted from the hacker to the second voice recognition apparatus 240. In addition, the first voice recognition apparatus 230 or the second voice recognition apparatus 240 may be hacked so that the STT processor 231 can receive a voice signal from a hacker or the analysis processor 243 can receive a text from a hacker.

In this case, the command eventually selected by the analysis processor 243 reflects a hacker's intention instead of a user's intention. The operation based on the command generated without reflecting a user's intention is may threaten the user's security and safety.

Therefore, the analysis processor 243 according to an exemplary embodiment determines whether a command is normal, i.e. whether the command matches a user's intention when the command is selected corresponding to the text. A method of determining whether the command matches a user's intention will be described later. When it is determined that the command matches a user's intention, the analysis processor 243 transmits the command to the second electronic apparatus 220 so that an operation can be performed corresponding to the command.

On the other hand, when it is determined that the command does not match a user's intention, the analysis processor 243 prevents the operation corresponding to the command from being automatically performed and implements subsequent processes. Such subsequent processes may be achieved by various methods, and descriptions thereof will be described later.

Figure 3:
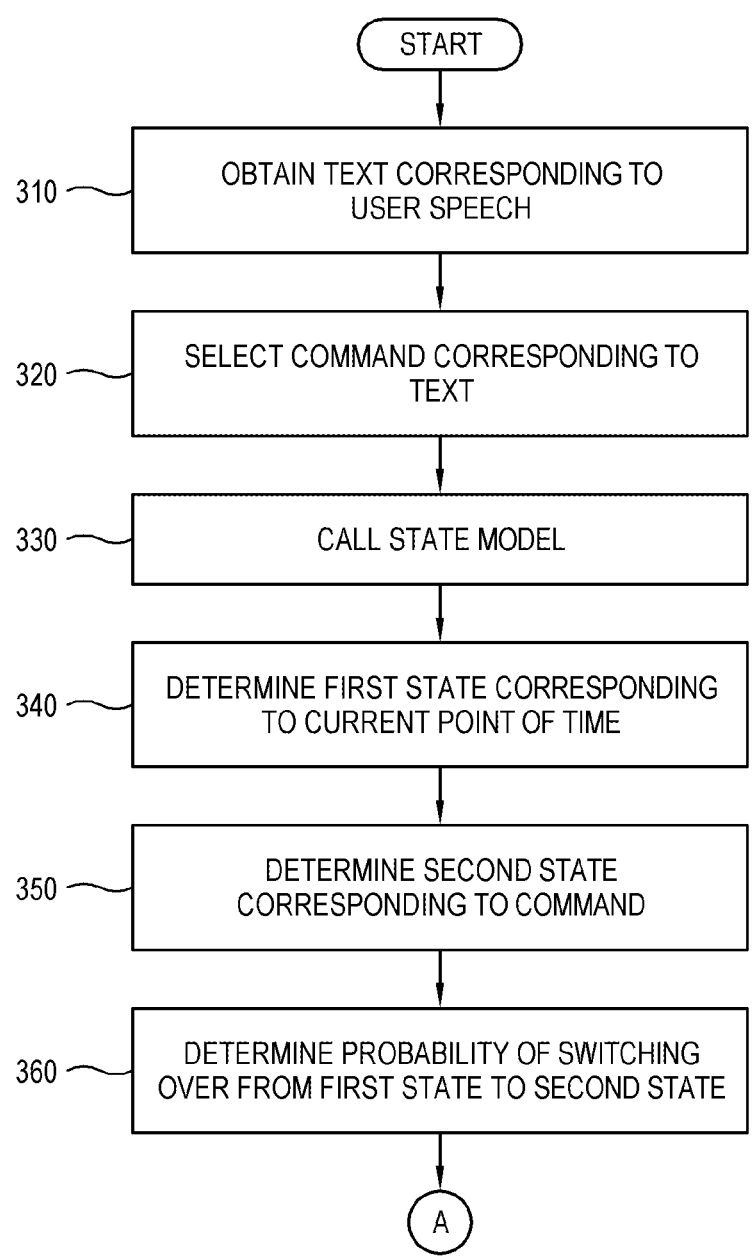
FIG. 3 and FIG. 4 are a flowchart of showing a control method of the voice recognition apparatus according to an exemplary embodiment.
Figure 4:
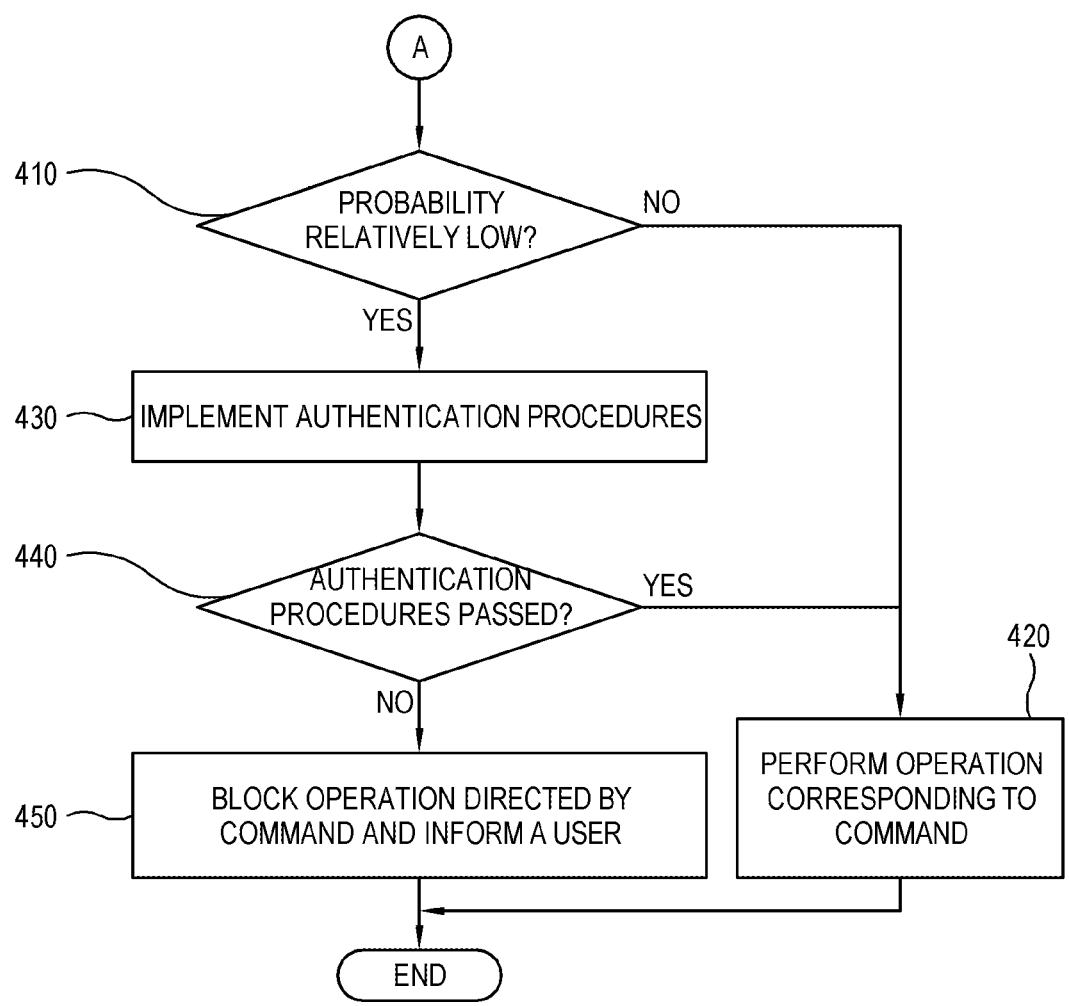

FIG. 3 and FIG. 4 are a flowchart of showing a control method of the voice recognition apparatus according to an exemplary embodiment.

As shown in FIG. 3, at operation 310 the voice recognition apparatus obtains a text corresponding to a user speech.

At operation 320, the voice recognition apparatus analyzes content of the obtained text, and selects the command corresponding to the text.

At operation 330, the voice recognition apparatus calls (e.g., accesses) a preset state model. The state model defines a plurality of states previously set in the system, and a value of a switching probability between the states.

Herein, the state of the system refers to a state about at least one among at least one electronic apparatus within the system, a location where the system operates, and a user who uses the system. For example, the state of the system includes a state about a user's activities, a state about a user's position within a location where the system is installed, a state about an operation of the electronic apparatus, a state about a location where the system is installed, etc. The states of the system will be described later in detail.

At operation 340, the voice recognition apparatus determines a first state corresponding to a current point of time among the plurality of states in the state model. To determine the first state at a current point of time, the voice recognition apparatus takes sensed information collected in the electronic apparatus of the system, a history of user inputs, a history of operations, etc. into account.

At operation 350, the voice recognition apparatus determines a second state corresponding to a selected command among the plurality of states in the state model. The second state corresponding to the command refers to the state of the system when the system operates based on the command.

At operation 360, the voice recognition apparatus determines a probability of switching over from the first state to the second state.

As shown in FIG. 4, at operation 410 the voice recognition apparatus determines whether the value of the previously determined probability is relatively high or low (e.g., when compared against a threshold). The voice recognition apparatus may use various methods to determine whether the probability is high or low. Examples of these methods will be described later.

When it is determined that the value of the probability is relatively high, the voice recognition apparatus allows the operation corresponding to the command to be performed at operation 420. For example, the voice recognition apparatus identifies a target, at which the operation corresponding to the command is aimed, within the system, and transmits the command to the identified target.

On the other hand, when it is determined that the value of the probability is relatively low, at operation 430 the voice recognition apparatus implements authentication procedures for authenticating the execution of the command. This authentication procedures include general operations for allowing a user to confirm whether the command is normally caused by her speech. The authentication procedures may be achieved by various methods, and will be described later.

At operation 440, the voice recognition apparatus determines whether the authentication procedures are passed.

When the voice recognition passes the authentication procedures, the voice recognition apparatus returns to the operation 420, thereby performing the operation corresponding to the command.

On the other hand, when the voice recognition fails the authentication procedures, at operation 450, the voice recognition apparatus prevents the operation corresponding to the command from being performed and informs a user that the corresponding operation is not performed. A user may be informed by various methods such as a user interface (UI) or a warning message, etc.

Thus, the voice recognition apparatus according to one exemplary embodiment may determine whether the command based on the text is caused by the user speech, and allows or prevents the execution of the command.

In this regard, a recognition processing apparatus of the related art has used the following method in order to determine whether a predetermined command is caused by a user's speech. The recognition processing apparatus of the related art determines whether an identified text includes a preset specific word, and determines that a word or sentence input following the specific word is caused by a user's speech when the identified text includes the specific word. However, even in this case, it may be difficult or impossible to defend against hacking when the preset specific word is exposed to a hacker.

On the contrary, the voice recognition apparatus according to this exemplary embodiment employs a previously designed model to determine a probability that the command will be normally caused by a user's speech. By preventing the command, the probability of which is low, from being automatically executed, it is possible to effectively circumvent an attack of a hacker on the voice recognition system.

Below, the previously designed state model will be described.

Figure 5:
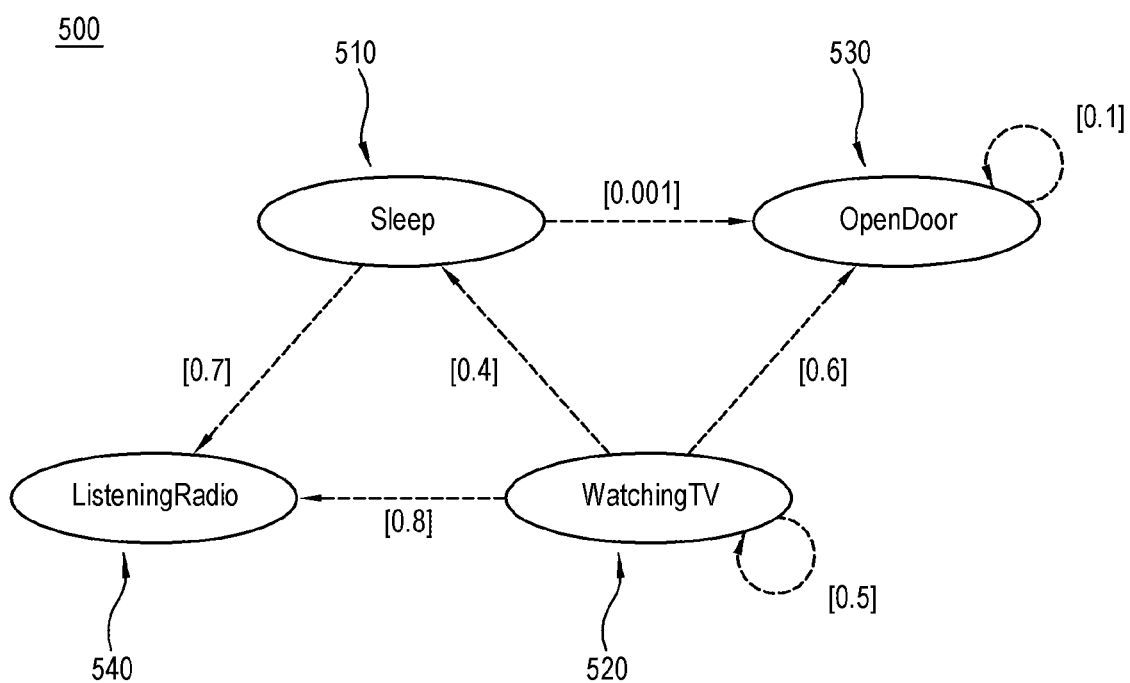
FIG. 5 shows an example of a partial design of state models referred to by the voice recognition apparatus according to an exemplary embodiment.

FIG. 5 shows an example of a partial design of state models referred to by the voice recognition apparatus according to an exemplary embodiment.

As shown in FIG. 5, the voice recognition apparatus calls a state model 500. When a command is selected corresponding to a text of a user speech, the voice recognition apparatus identifies the first state corresponding to the current point of time and the second state corresponding to the command in the called state model 500. FIG. 5 merely shows a very simple state model 500 for describing an embodiment, and the state model 500 designed in practice may include many states and be more complicated.

The state model 500 basically includes two elements. One element is a plurality of states 510, 520, 530, and 540, and the other element is a switching probability between any two of the states 510, 520, 530, and 540. Since the switching probability is basically established in between two of the states 510, 520, 530, and 540, the state model 500 has to include at least two states 510, 520, 530, and 540. The state model 500 may be designed by a manufacturer in accordance with previous experiments, data, etc., or may be input by a user.

Each of the states 510, 520, 530, and 540 refers to a state of one or more electronic apparatuses within the voice recognition system. In more detail, the states 510, 520, 530, and 540 may show states of all objects related to the voice recognition system. For example, the states 510, 520, 530, and 540 may include a state about activities of a user who uses the system, a state about a location where the electronic apparatus within the system is installed, or a state about an operation of the electronic apparatus in the system. However, information for determining the state about a user or a location may be basically collected by the electronic apparatus in the system through a sensing, input or like method. Therefore, the states 510, 520, 530, and 540 defined in the state model 500 may show the states of the system or the states of the electronic apparatuses in the system.

The states 510, 520, 530, and 540 may be defined by one or more parameters. There are various design methods depending on which parameters are used. For example, one of the states 510, 520, 530, and 540 may include three kinds of parameters such as an activity showing content of each operation of the states 510, 520, 530, and 540; a time showing time during which each the operation of the states 510, 520, 530, and 540 is performed; a location at which each operation of the states 510, 520, 530, and 540 is performed; etc.

For example, a Sleep state 510 indicates a state that a user sleeps in a bed from 12 a.m. to 7 a.m. In this case, the Sleep state 510 has an activity parameter of "Sleep," a time parameter of "12 a.m. to 7 a.m.," and a location parameter of "bed."

A WatchingTV state 520 indicates a state in which a TV is turned on in a living room from 8 p.m. to 10 p.m. In this case, the WatchingTV state 520 has an activity parameter of "watching TV," a time parameter of "8 p.m. to 10 p.m.," and a location parameter of "living room."

An OpenDoor state 530 indicates a state in which a front door is opened from 6 a.m. to 10 p.m. In this case, the OpenDoor state 530 has an activity parameter of "opening the front door," a time parameter of "6 a.m. to 10 p.m.," and a location parameter of "front Door."

A ListeningRadio state 540 indicates a state that a radio is turned on in a bedroom from 10 p.m. to 12 a.m. In this case, the ListeningRadio state 540 has an activity parameter of "listening radio," a time parameter of "10 p.m. to 12 a.m.," and a location parameter of "bedroom."

Like this, the states 510, 520, 530, and 540 in the state model 500 indicate operation states of at least one among one or more electronic apparatuses, users, and locations. The voice recognition apparatus identifies a certain state 510, 520, 530, or 540 based on information collected through one or more electronic apparatuses in the system, among the plurality of states 510, 520, 530, and 540.

For example, the electronic apparatus, which includes a sensor for sensing a user's position, can determine the user's position through the sensor. Further, the electronic apparatus, which includes a clock or is capable of obtaining information about a current time through a network, can determine the current time. Further, the electronic apparatus may generate information about the current operation state in itself and transmit the information to another apparatus. Further, the electronic apparatus may perform a specific operation in response to a user's input, store a history of a user's inputs and corresponding operations, and transmit the stored history to another apparatus.

The voice recognition apparatus may select one of the states 510, 520, 530, and 540 within the state model 500, based on various pieces of collected information.

By the way, the state model 500 includes the switching probabilities established between the plurality of states 510, 520, 530, and 540. The switching probability quantifies a probability of switching from a predetermined state 510, 520, 530, or 540 over to another state 510, 520, 530, or 540.

For example, for convenience of description, one among the plurality of states corresponding to the current point of time will be called the first state, and one corresponding to the execution of the command will be called the second state. When a probability of switching over from the first state to the second state has a relatively high value, this switching is more likely to occur, and it is probable that the command is normally caused by a user's speech. On the other hand, when a probability of switching over from the first state to the second state has a relatively low value, this switching is less likely to occur, and it is improbable that the command is normally caused by a user's speech.

Among the plurality of states 510, 520, 530, and 540, the first state and the second state may be different states or the same state.

The voice recognition apparatus may have one or more preset threshold values. When a value of a probability of switching over from the first state to the second state is taken from the state model 500, the voice recognition apparatus determines whether the value is higher than the threshold value. The voice recognition apparatus determines that the switching probability is high when it is determined that the value is higher than the threshold value, and determines that the switching probability is low when it is determined that the value is lower than the threshold value. The threshold value may be set in the state model 500, set by the voice recognition apparatus itself, or set by a user.

For example, suppose that the first state corresponding to the current point of time is the WatchingTV state 520, and the second state directed by the command is the OpenDoor state 530. In this case, the voice recognition apparatus may draw a value of 0.6 from the state model 500 as a probability of switching over from the WatchingTV state 520 to the OpenDoor state 530. The voice recognition apparatus compares the probability value with the threshold value. When the threshold value is 0.5, the probability value 0.6 is higher than the threshold value. Thus, the voice recognition apparatus determines that the probability of switching over from the WatchingTV state 520 to the OpenDoor state 530 is relatively high, and determines that the command is likely caused by a normal input. In accordance with determination results, the voice recognition apparatus allows the command to be executed.

In addition, suppose that the first state corresponding to the current point of time is the WatchingTV state 520, and the second state directed by the command is the Sleep state 510. In this case, the voice recognition apparatus may take a value of 0.4 as a probability of switching over from the WatchingTV state 520 to the Sleep state 510, and compares the drawn probability value with the threshold value. Since the probability value 0.4 is lower than the threshold value, the voice recognition apparatus determines that the probability of switching over from the WatchingTV state 520 to the Sleep state 510 is relatively low, and determines that the command is caused by an abnormal input. Thus, the voice recognition apparatus puts the execution of the command on hold, and performs the authentication procedures for allowing a user to authenticate whether the command is normally input by the user.

The voice recognition apparatus allows the command to be executed when a user's authentication is performed in the authentication procedures, and blocks the execution of the command and warns a user when a user's authentication is not performed in the authentication procedures.

Herein, various methods may be applied to the authentication procedures as follows.

Figure 6:
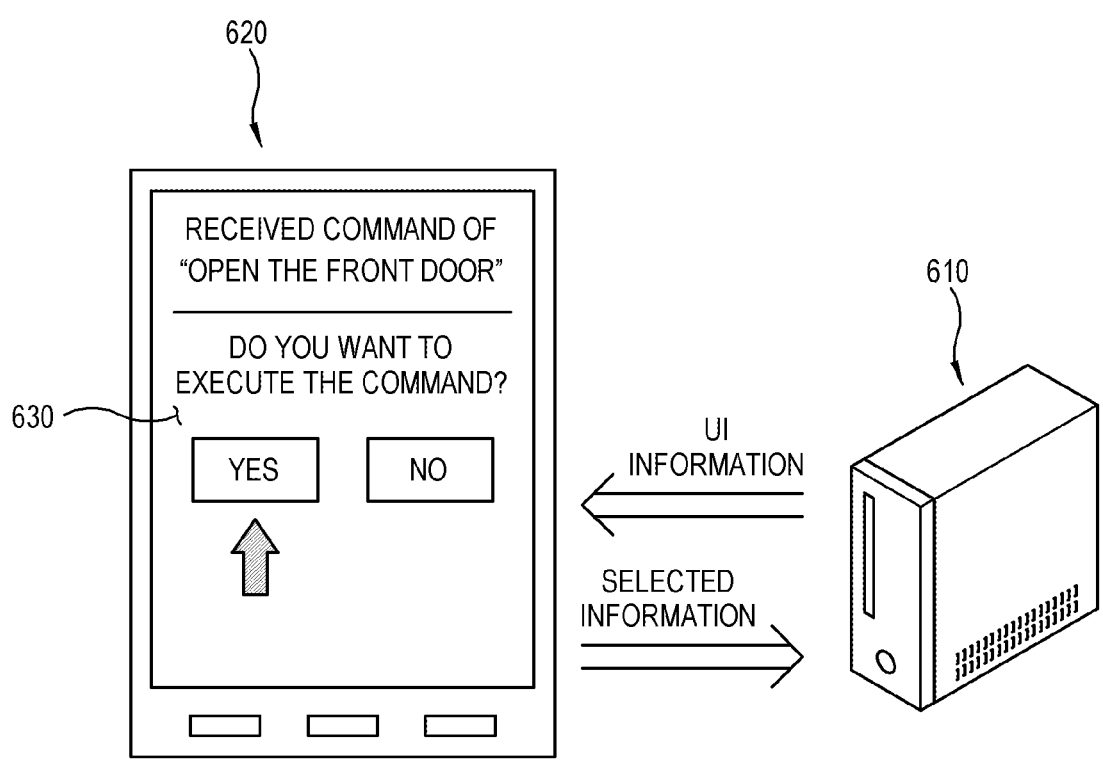
FIG. 6 shows an example of a user interface (UI), which makes a request for a user to authenticate a command, and is displayed by the voice recognition apparatus according to an exemplary embodiment.

FIG. 6 shows an example of a user interface (UI), which makes a request for a user to authenticate a command, displayed by the voice recognition apparatus according to an exemplary embodiment.

As shown in FIG. 6, a voice recognition apparatus 610 is configured to display a UI 630, which makes a request for a user to select whether to execute a predetermined command, when it is determined that a provability of switching over to a state caused by execution of a command is relatively low. When the voice recognition apparatus 610 includes a display in itself, the UI 630 may be displayed on the display of the voice recognition apparatus 610. Alternatively, when the voice recognition apparatus 610 cannot display the UI 630 in itself, UI information may be transmitted to a predetermined display apparatus 620 of a user, so that the UI 630 can be displayed on the display apparatus 620.

The UI 630 may include various pieces of information, and provide content of a command and options for confirming the execution of the command. Through the UI 630, a user may make an input for instructing the command to be executed or blocked.

The display apparatus 620 feeds selection information based on a user's input through the UI 630 back to the voice recognition apparatus 610. In response to the received selection information, the voice recognition apparatus 610 may allow or block the execution of the command.

Alternatively, the following authentication procedures are also possible.

Figure 7:
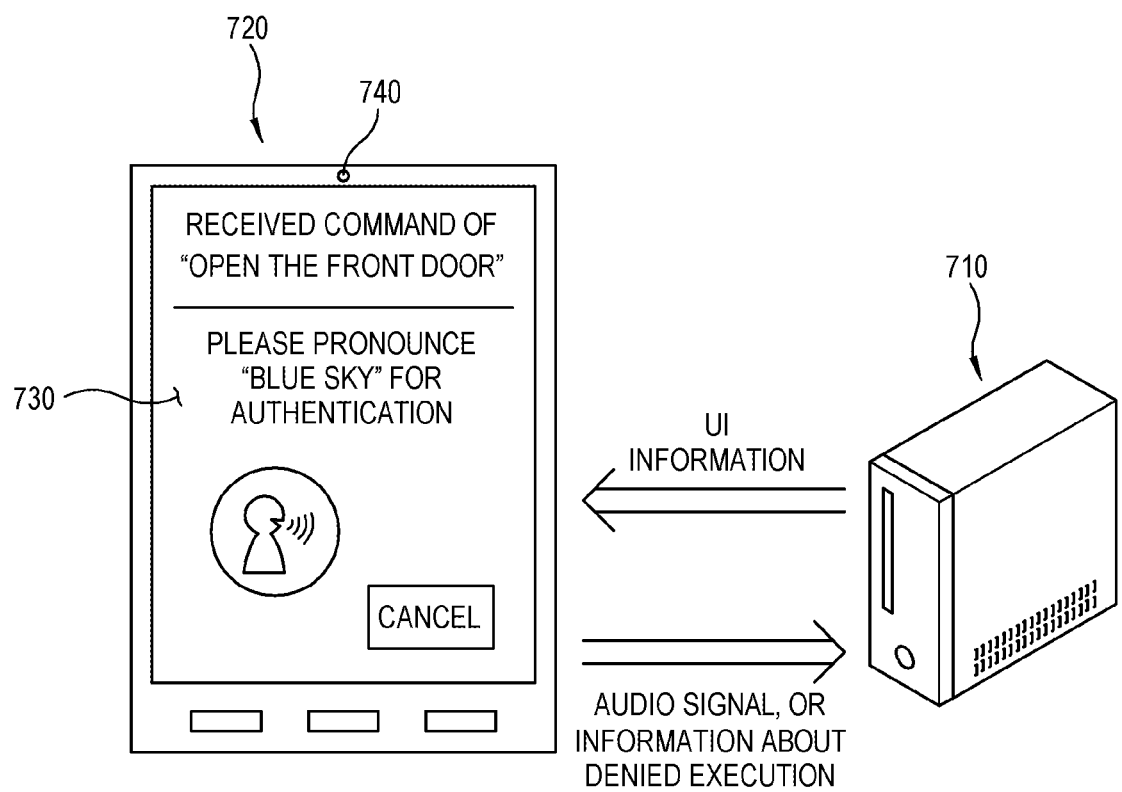
FIG. 7 shows an example of a UI, which makes a request for a user to pronounce a specific word, and is displayed by the voice recognition apparatus according to an exemplary embodiment.

FIG. 7 shows an example of a UI, which makes a request for a user to pronounce a specific word, displayed by the voice recognition apparatus according to one exemplary embodiment.

As shown in FIG. 7, a voice recognition apparatus 710 displays a UI 730, which makes a request for a user to pronounce a predetermined word, when it is determined that a probability of switching over to a state caused by execution of a command is relatively low. The voice recognition apparatus 710 may display the UI 730 in itself, or may transmit UI information to a separate display apparatus 720 so that the display apparatus 720 can display the UI 730. In this embodiment, the apparatus for displaying the UI 730 includes a microphone 740.

The UI 730 includes content of the command, and a text of words requested to be pronounced by a user. A user may pronounce the words directed in the UI 730 when it is determined that the command displayed on the UI 730 is caused by a normal input, but may not pronounce the words directed in the UI 730 or may make an input for denying the execution of the command when it is determined that the command is caused by an abnormal input.

When receiving a user speech through the microphone 740, the display apparatus 720 transmits an audio signal corresponding to the speech to the voice recognition apparatus 710. The voice recognition apparatus 710 analyzes and determines whether the received audio signal corresponds to the words indicated in the UI 730, and allows the execution of the command when they do correspond, or otherwise blocks the execution of the command.

Further, when the microphone 740 receives no user speech for a preset period of time or the execution of the command is denied through the UI 730, the display apparatus 720 transmits information for instructing the command not to be executed to the voice recognition apparatus 710. In response to the received information, the voice recognition apparatus 710 blocks the execution of the command.

Herein, the words requested to be pronounced by a user may be previously designated in the voice recognition apparatus 710. However, when a previously designated specific word is exposed to a hacker, the authentication procedures may be disabled by the hacker. Therefore, the voice recognition apparatus 710 may generate and use a random word through a random number algorithm to implement the authentication procedures. Thus, the voice recognition apparatus 710 can improve the security of the authentication procedures.

In the foregoing state model, invariable values may be previously designated as the values of the switching probability between two states. Alternatively, the values of the switching probability between two states may be varied depending on a process history of the voice recognition apparatus in accordance with embodiments. Below, such an embodiment will be described.

FIG. 8 is a table showing a principle of adjusting each value of switching probability in a state model referred to by the voice recognition apparatus according to an exemplary embodiment.

As shown in FIG. 8, values of a switching probability between two states among plurality of states may be tabulated in the state model. This table is just given for convenience of description to simply and clearly show the principle of this exemplary embodiment, and does not necessarily imply that the voice recognition apparatus has to create and manage such a table.

In this table, "FROM" shows the first state corresponding to the current point of time, "TO" shows the second state corresponding to execution of command, and "DEFAULT VALUE" shows a value of a switching probability initially set in the state model.

As described in the foregoing exemplary embodiments, when the processes of determining whether a command is normally caused by a user speech are performed, the voice recognition apparatus adjusts the default value in accordance with process results. That is, the voice recognition apparatus compensates the value of the switching probability between the first state and the second state in the state model for an offset value corresponding to the process results. In this table, "ADJUSTED VALUE" shows a result from compensating "DEFAULT VALUE" for the offset value according to the process results, and is additionally adjusted as the processes are repeated.

In accordance with the process results, there are two kinds of offset values which includes a first value for a case where a probability of switching from the first state over to the second state is relatively high, and a second value for a case where a probability of switching from the first state over to the second state is relatively low. In this exemplary embodiment, the first value is a positive value, and the second value is a negative value. In accordance with design methods, the absolute value of the first value may be equal to or different from the absolute value of the second value.

For example, the probability of switching from the WatchingTV state over to the OpenDoor state has a default value of 0.6. With this, suppose that the first value is 0.01, and the second value is −0.02. During a process for a predetermined command, the voice recognition apparatus adjusts the default value by adding 0.01 to the default value of 0.6 when it is determined that the switching probability is relatively high or the authentication procedures are passed, or by adding −0.02 to the default value of 0.6 when it is determined that the switching probability is relatively low or the authentication procedures are not passed.

As the process continues, the voice recognition apparatus applies the cumulative compensations to the adjusted value. Thus, the value of the switching probability is not the default value but the adjusted value in accordance with the cumulative processes. Based on such an adjusted value, the voice recognition apparatus determines whether the switching probability is relatively high or not. Thus, the voice recognition apparatus undergoes a kind of learning process and thus provides an optimized state model to a user.

For example, when the threshold value is 0.5, it is determined that the probability of switching from the WatchingTV state over to the OpenDoor state is relatively high since the default value thereof is 0.6. However, when the default value is adjusted into 0.45 by reflecting a user's intention in the state model through a learning process according to an exemplary embodiment, it is determined that the switching probability in this case is relatively low.

On the other hand, it is determined that the probability of switching from the WatchingTV state over to the Sleep state is relatively low since the default value thereof is 0.4. However, when the default value is adjusted into 0.7 as the processes are accumulated, it is determined that the probability in this case is relatively high.

Like this, the default value is adjusted with the cumulative results of the processes, and therefore, the voice recognition apparatus can provide more optimized results to a user.

Below, a method of controlling the voice recognition apparatus according to an exemplary embodiment will be described.

Figure 9:
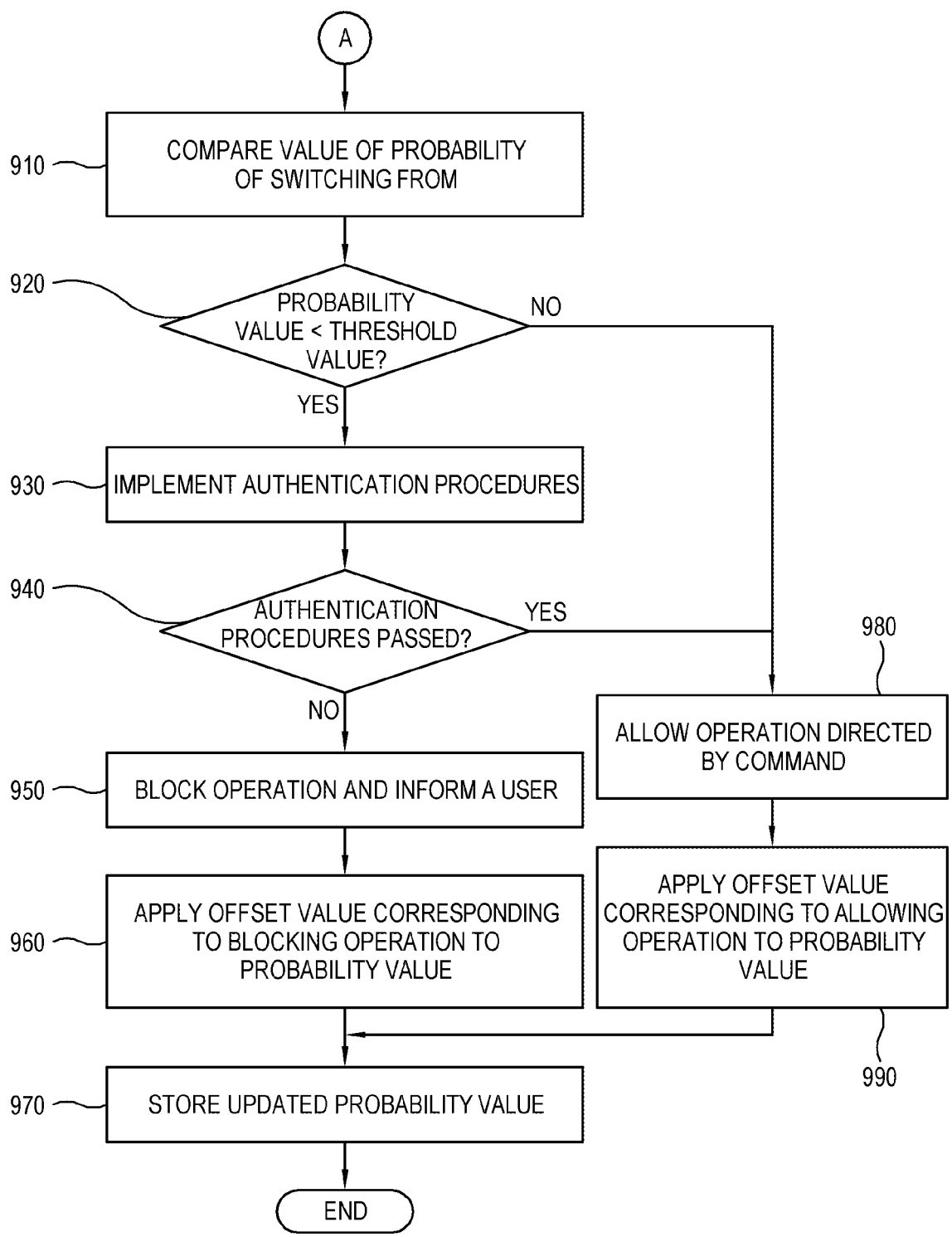
FIG. 9 is a flowchart of showing a control method of the voice recognition apparatus according to an exemplary embodiment.

FIG. 9 is a flowchart showing a control method of the voice recognition apparatus according to an exemplary embodiment.

As shown in FIG. 9, operations in this embodiment are continued from the foregoing operations shown in FIG. 3. That is, this embodiment shows operations improved from the operations shown in FIG. 4.

At operation 910, the voice recognition apparatus compares the value of the probability of switching from the first state corresponding to the current point of time over to the second state corresponding to an instruction of the command with the threshold value.

At operation 920, the voice recognition apparatus determines whether the probability value is lower than the threshold value.

When it is determined that the probability value is lower than the threshold value, at operation 930, the voice recognition apparatus puts the operations directed by the command on hold, and performs the authentication procedures with regard to the command. The authentication procedures are equivalent to those described in the foregoing exemplary embodiment.

At operation 940, the voice recognition apparatus determines whether the authentication procedures are successfully passed.

When the authentication procedures are not passed, at operation 950, the voice recognition apparatus blocks the operation directed by the command, and informs a user that the operation was not performed.

At operation 960, the voice recognition apparatus applies an offset value, which corresponds to the blocked operation directed by the command, to the probability value, thereby updating the probability value.

At operation 970, the voice recognition apparatus stores the updated probability value.

On the other hand, when it is determined in the operation 920 that the probability value is higher than the threshold value or when the authentication procedures are successfully passed in the operation 940, the voice recognition apparatus allows the operation directed by the command to be performed at operation 980.

At operation 990, the voice recognition apparatus applies an offset value, which corresponds to the allowed operation directed by the command, to the probability value, thereby updating the probability value and moving to the operation 970.

Thus, the voice recognition apparatus can provide an optimized voice recognition environment to a user.

In the foregoing exemplary embodiment, the first state corresponding to the current point of time is identified as one among the plurality of preset states in the state model. However, two or more states may correspond to the first state in accordance with situations. In this case, the voice recognition apparatus puts the operation directed by the command on hold, and implements the authentication procedures as described above, thereby determining whether to perform the operation.

In the foregoing exemplary embodiments, the electronic apparatus for receiving the user speech and the voice recognition apparatus for processing the voice recognition are provided as separate apparatuses. Referring to FIG. 2, the first electronic apparatus includes the microphone, the first voice recognition apparatus performs the STT process, and the second voice recognition apparatus performs the analysis process with regard to the command. However, this is only one method of implementing an exemplary embodiment of the present disclosure. For example, the electronic apparatus and the voice recognition apparatus may be provided as a single apparatus. That is, the voice recognition apparatus may be configured to include both the microphone and the analysis processor. Alternatively, one voice recognition apparatus may perform both the STT process and the analysis process.

Below, basic hardware elements of the voice recognition apparatus will be described.

Figure 10:
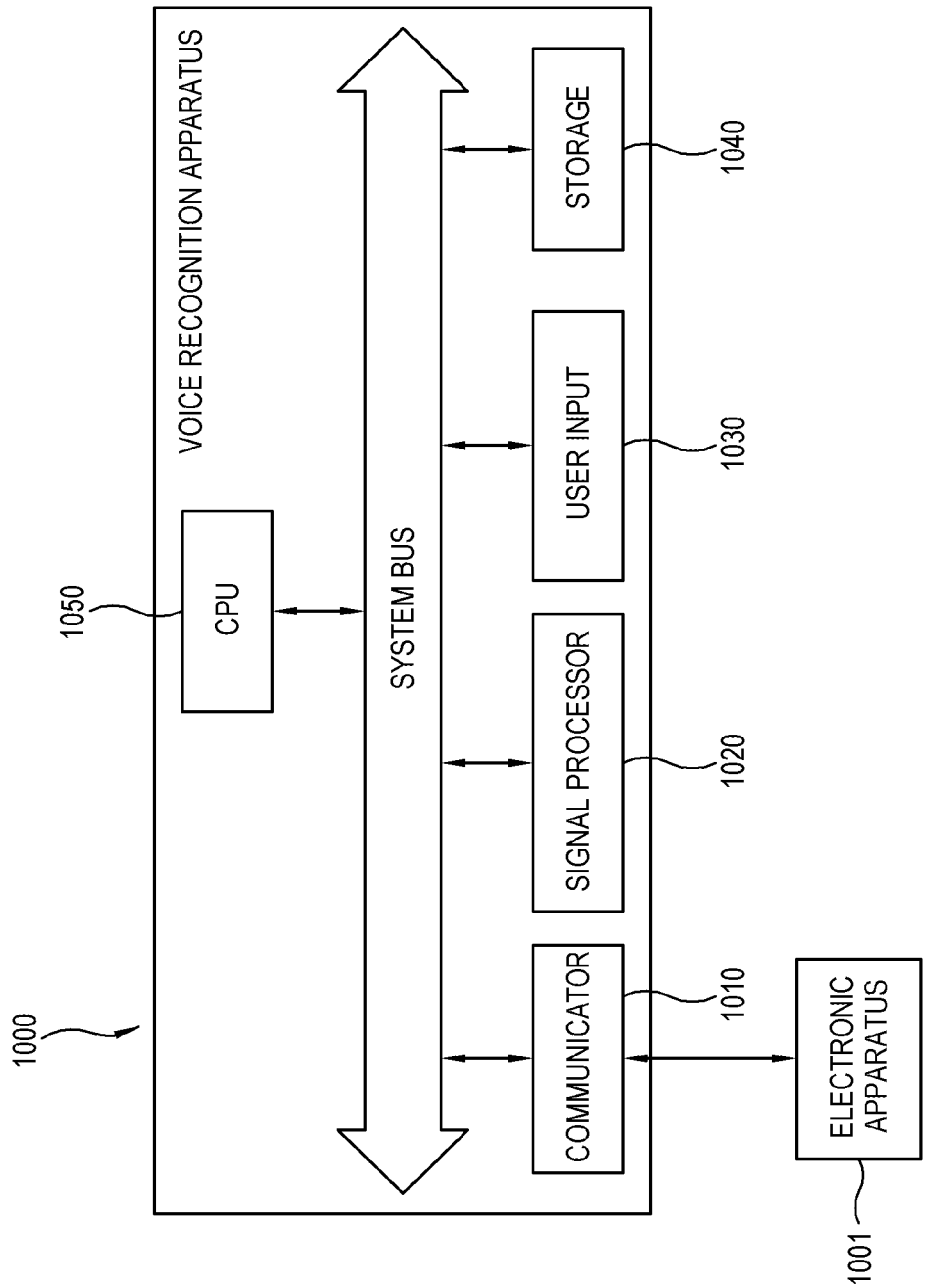
FIG. 10 is a block diagram of the voice recognition apparatus according to an exemplary embodiment.

FIG. 10 is a block diagram of the voice recognition apparatus according to an exemplary embodiment.

As shown in FIG. 10, a voice recognition apparatus 1000 according to this exemplary embodiment includes a communicator 1010 configured to communicate with an external electronic apparatus 1001, a signal processor 1020 configured to process data received in the communicator 1010, a user input 1030 configured to receive a user's input, a storage 1040 configured to store data, and a control processing unit (CPU) 1050 configured to perform computations for processes in the signal processor 1020 and control operations of the voice recognition apparatus 1000. These elements are connected to one another through a system bus.

In this exemplary embodiment, the CPU 1050 is provided separately from the signal processor 1020, but it is not limited thereto. Alternatively, the CPU 1050 may be achieved by a single system on chip (SoC) integrated with the signal processor 1020.

The communicator 1010 includes a communication interface circuit such as a communication chip, a local area network (LAN) card, etc. The communicator 1010 includes an Ethernet module supporting a wired communication protocol, or a wireless communication module supporting a wireless communication protocol such as Wi-Fi, Bluetooth, etc. The communicator 1010 may transmit data received from the electronic apparatus 1001 to the CPU 1050 or the like, and transmit the data from the CPU 1050 to the electronic apparatus 1001.

The signal processor 1020 includes a processing board, which has one or more chipsets and circuits, a SoC, or a processor. The signal processor 1020 analyzes a predetermined text to select or identify a corresponding command, and performs the function of the analysis processor or the like voice recognition process of as described in the foregoing embodiments.

The user input 1030 is configured to transmit various preset events generated in response to a user's control or input to the CPU 1050. The user input 1030 may be variously implemented in accordance with methods of inputting information, e.g. by a physical or electronic button, a touch screen, a touch pad, etc.

The storage 1040 is configured to store various pieces of data in accordance with processing operations of the CPU 1050 and the signal processor 1020. The storage 1040 includes a flash memory, a hard disk drive (HDD), a solid-state drive (SSD), and like nonvolatile memory, in which data is retained regardless of whether the voice recognition apparatus 1000 is powered on or off, and a random access memory (RAM), a buffer, and like volatile memory in which data to be processed by the CPU 1050 or the signal processor 1020 is temporarily loaded. The DB as described above in FIG. 2 is stored in the storage 1040.

The CPU 1050 performs central computation for the processing operations of the signal processor 1020, and basically takes a central role of analysis and computation of data.

With this structure, the voice recognition apparatus 1000 can perform the voice recognition processes as described above in the foregoing exemplary embodiments.

The methods according to the foregoing exemplary embodiments may be achieved in the form of a program command that can be implemented in various computers, and recorded in a computer-readable medium. Such a computer-readable medium may include a program command, a data file, a data structure or the like, or combination thereof. For example, the computer-readable medium may be stored in a voltage or nonvolatile storage such as a read-only memory (ROM) or the like, regardless of whether it is erasable or rewritable, for example, a RAM, a memory chip, a device or integrated circuit (IC) like memory, or an optically or magnetically recordable or machine (e.g., a computer)-readable storage medium, for example, a compact disc (CD), a digital versatile disc (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specially designed and configured according to the exemplary embodiments, or may be publicly known and available to those skilled in the art of computer software.

Although a few exemplary embodiments have been shown and described, it will be appreciated by those skilled in the art that changes may be made in these exemplary embodiments without departing from the principles and spirit of the disclosure, the scope of which is defined in the appended claims and their equivalents.

What is claimed is:

1. An electronic apparatus comprising:
a receiver configured to receive a voice command of a user;
a storage configured to store switching probabilities previously set between a plurality of states related to the electronic apparatus, each of the plurality of states comprising an activity showing content of each operation of the plurality of states, a time showing time during which each operation of the plurality of states is performed and a location at which each operation of the plurality of states is performed; and a processor configured to:
based on receiving the voice command through the receiver, identify a first state corresponding to a current point of time among the plurality of states,
identify a second state corresponding to the voice command among the plurality of states, wherein the second state corresponding to the voice command indicates a state of the electronic apparatus when the electronic apparatus executes the voice command,
identify a switching probability from the identified first state corresponding to the current point of time over to the identified second state corresponding to the voice command, among the switching probabilities, and
selectively allow or prevent an execution of the voice command in accordance with the identified switching probability,
wherein the processor is further configured to:
allow the execution of the voice command based on the identified switching probability being greater than a threshold value,
perform an authentication procedure with regard to the voice command based on the identified switching probability being less than or equal to the threshold value,
allow the execution of the voice command based on the authentication procedure being successfully passed,
prevent the execution of the voice command based on the authentication procedure not being successfully passed, and
adjust a value of the switching probability of the switching probabilities stored in the storage by adding a preset first value to the value of the switching probability of the switching probabilities stored in the storage based on the authentication procedure being successfully passed, and subtracting a preset second value from the value of the switching probability of the switching probabilities stored in the storage based on the authentication procedure not being successfully passed.

2. The electronic apparatus according to claim 1, wherein the processor is further configured to:
generate a warning message to be displayed based on the authentication procedure not being successfully passed.

3. The electronic apparatus according to claim 1, wherein the processor is further configured to:
generate a user interface (UI) for the user to authenticate the voice command;
display the UI on at least one of a display of the electronic apparatus and a display apparatus communicating with the electronic apparatus; and
identify whether to pass the authentication procedure based on inputs to the UI.

4. The electronic apparatus according to claim 1, wherein the processor is further configured to:
generate a user interface (UI) for guiding the user to pronounce a word;
display the UI on at least one of a display of the electronic apparatus and a display apparatus communicating with the electronic apparatus; and
identify whether to pass the authentication procedure based on a voice input by pronouncing the word displayed on the UI.

5. The electronic apparatus according to claim 4, wherein the processor is further configured to randomly generate the word.

6. The electronic apparatus according to claim 1, wherein the processor is further configured to identify the first state based on at least one of sensed information collected through the electronic apparatus, a history of user inputs to the electronic apparatus, and a history of operations performed by the electronic apparatus.

7. A method of controlling an electronic apparatus, the method comprising:
storing switching probabilities previously set between a plurality of states related to the electronic apparatus, each of the plurality of states comprising an activity showing content of each operation of the plurality of states, a time showing time during which each operation of the plurality of states is performed and a location at which each operation of the plurality of states is performed;
receiving a voice command of a user;
based on receiving the voice command, identifying a first state corresponding to a current point of time among the plurality of states;
identifying a second state corresponding to the voice command among the plurality of states, wherein the second state corresponding to the voice command indicates a state of the electronic apparatus when the electronic apparatus executes the voice command;
identifying a switching probability from the identified first state corresponding to the current point of time over to the identified second state corresponding to the voice command, among the switching probabilities; and
selectively allowing or preventing an execution of the voice command in accordance with the identified switching probability,
wherein the selectively allowing or preventing the execution of the voice command comprises:
allowing the execution of the voice command based on the identified switching probability being greater than a threshold value,
performing an authentication procedure with regard to the voice command based on the identified switching probability being less than or equal to the threshold value,
allowing the execution of the voice command based on the authentication procedure being successfully passed,
preventing the execution of the voice command based on the authentication procedure not being successfully passed, and
adjusting a value of the switching probability of the stored switching probabilities by adding a preset first value to the value of the switching probability of the stored switching probabilities based on the authentication procedure being successfully passed, and subtracting a preset second value from the value of the switching probability of the stored switching probabilities based on based on the authentication procedure not being successfully passed.

8. The method according to claim 7, wherein the performing the authentication procedure comprises:
generating a warning message to be displayed based on the authentication procedure not being successfully passed.

9. The method according to claim 7, wherein the performing the authentication procedure comprises:
generating a user interface (UI) for the user to authenticate the voice command;
displaying the UI on at least one of a display of the electronic apparatus and a display apparatus communicating with the electronic apparatus; and identifying whether to pass the authentication procedure based on inputs to the UI.

10. The method according to claim 7, wherein the performing the authentication procedure comprises:
generating a user interface (UI) for guiding the user to pronounce a word;
displaying the UI on at least one of a display of the electronic apparatus and a display apparatus communicating with the electronic apparatus; and
identifying whether to pass the authentication procedure based on a voice input by pronouncing the word displayed on the UI.

11. The method according to claim 10, wherein the electronic apparatus randomly generates the word.

12. The method according to claim 7, wherein the identifying the first state comprises identifying the first state based on at least one of sensed information collected through the electronic apparatus, a history of user inputs to the electronic apparatus, and a history of operations performed by the electronic apparatus.

13. A non-transitory recording medium storing a program that is executable by a processor of an electronic apparatus to perform a method of controlling the electronic apparatus, the method comprising:
storing switching probabilities previously set between a plurality of states related to the electronic apparatus, each of the plurality of states comprising an activity showing content of each operation of the plurality of states, a time showing time during which each operation of the plurality of states is performed and a location at which each operation of the plurality of states is performed;
receiving a voice command of a user;
based on receiving the voice command, identifying a first state corresponding to a current point of time among the plurality of states;
identifying a second state corresponding to the voice command among the plurality of states, wherein the second state corresponding to the voice command indicates a state of the electronic apparatus when the electronic apparatus executes the voice command;
identifying a switching probability from the identified first state corresponding to the current point of time over to the identified second state corresponding to the voice command, among the switching probabilities; and
selectively allowing or preventing an execution of the voice command in accordance with the identified switching probability,
wherein the selectively allowing or preventing the execution of the voice command comprises:
allowing the execution of the voice command based on the identified switching probability being greater than a threshold value,
performing an authentication procedure with regard to the voice command based on the identified switching probability being less than or equal to the threshold value,
allowing the execution of the voice command based on the authentication procedure being successfully passed,
preventing the execution of the voice command based on the authentication procedure not being successfully passed, and
adjusting a value of the switching probability of the stored switching probabilities by adding a preset first value to the value of the switching probability of the stored switching probabilities based on based on the authentication procedure being successfully passed, and subtracting a preset second value from the value of the switching probability of the stored switching probabilities based on based on the authentication procedure not being successfully passed.

* * * * *